US012803977B2

(12) United States Patent
Endo et al.

(10) Patent No.: US 12,803,977 B2
(45) Date of Patent: Nov. 17, 2026

(54) AUTHENTICATION SYSTEM, AUTHENTICATION METHOD, AND REGISTRATION METHOD

(71) Applicant: Rakuten Group, Inc., Tokyo (JP)

(72) Inventors: Daiki Endo, Tokyo (JP); Kenji Fukui, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 38 days.

(21) Appl. No.: 19/089,157

(22) Filed: Mar. 25, 2025

(65) Prior Publication Data

US 2025/0310324 A1 Oct. 2, 2025

(30) Foreign Application Priority Data

Mar. 28, 2024 (JP) ................................ 2024-054775

(51) Int. Cl.
*H04L 9/40* (2022.01)
*G06Q 20/40* (2012.01)
(Continued)

(52) U.S. Cl.
CPC ... *H04L 63/0861* (2013.01); *G06Q 20/40145* (2013.01); *G06V 40/14* (2022.01); *G06V 40/28* (2022.01); *G06V 40/50* (2022.01)

(58) Field of Classification Search
CPC .......... H04L 63/0861; G06Q 20/40145; G06Q 20/18; G06Q 20/20; G06Q 20/4014;
(Continued)

(56) References Cited

U.S. PATENT DOCUMENTS

2018/0158044 A1* 6/2018 Beck .................. G06Q 20/3224
2022/0027866 A1* 1/2022 Choi .................. G06F 16/9566
(Continued)

FOREIGN PATENT DOCUMENTS

EP 3100152 B1 * 7/2019 ........... G06F 3/0488
JP 2016-62132 A 4/2016
(Continued)

OTHER PUBLICATIONS

Somkunwar et al.: Contactless Pam Vein Biometric Authentication and Health Monitoring Device, 2021, IEEE, pp. 16 (Year: 2021).*
(Continued)

*Primary Examiner* — Bijendra K Shrestha
(74) *Attorney, Agent, or Firm* — Sughrue Mion, PLLC

(57) ABSTRACT

An authentication method includes acquiring, by one or more processors, one or more gesture images. Each of the gesture images depicts a hand of a user making a gesture that has been determined by the user. The authentication method includes associating, by the one or more processors, a gesture depicted in each of the one or more gesture images with one instruction selected by the user from multiple instructions. The authentication method includes acquiring, by the one or more processors, an authentication image. The authentication image depicts the hand of the user making the gesture. The authentication method includes executing, by the one or more processors, biometric authentication and authentication of the gesture depicted in the authentication image by comparing the authentication image with the one or more gesture images. The authentication method includes outputting, by the one or more processors, the one instruction associated with the authenticated gesture.

8 Claims, 4 Drawing Sheets

(51) Int. Cl.
*G06V 40/14* (2022.01)
*G06V 40/20* (2022.01)
*G06V 40/50* (2022.01)

(58) Field of Classification Search
CPC ........ G06V 40/14; G06V 40/28; G06V 40/50; G06F 3/017; G06F 21/32; G07G 1/0036
See application file for complete search history.

(56) References Cited

U.S. PATENT DOCUMENTS

| | | | | |
|---|---|---|---|---|
| 2022/0157105 | A1* | 5/2022 | Varrasso | G07C 9/29 |
| 2026/0004295 | A1* | 1/2026 | Bennett | G06Q 20/40145 |

FOREIGN PATENT DOCUMENTS

| | | | |
|---|---|---|---|
| JP | 2017-49867 | A | 3/2017 |
| JP | 2022-30249 | A | 2/2022 |
| WO | 2019/176441 | A1 | 9/2019 |

OTHER PUBLICATIONS

Song et al.: Video Understanding-Based Random Hand Gesture Authentication, Oct. 2022, IEEE, pp. 453-470 (Year: 2022).*
Notice of Reasons for Refusal for Japanese Patent Application No. 2024-054775 dated Sep. 17, 2024.

* cited by examiner

AUTHENTICATION SYSTEM, AUTHENTICATION METHOD, AND REGISTRATION METHOD

CROSS-REFERENCE TO RELATED APPLICATIONS

This application is based upon and claims the benefit of priority from Japanese Patent Application No. 2024-054775, filed on Mar. 28, 2024, the entire contents of which are incorporated herein by reference.

BACKGROUND

1. Field

The present disclosure relates to an authentication system, an authentication method, and a registration method.

2. Description of Related Art

Japanese Laid-Open Patent Publication No. 2022-030249 discloses a method for issuing operational instructions using preregistered gestures to perform contactless payments at self-checkout systems. In this method, the payment is executed by a V-shaped gesture with the index and middle fingers, while the payment is canceled by a gesture of holding the palm of the hand facing forward.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

When executing payments using gesture-based instructions, it is necessary to ensure user authentication in advance to prevent unauthorized operations by third parties. For example, Japanese Laid-Open Patent Publication No. 2022-030249 discloses that user authentication is executed using a contactless biometric authentication (e.g., facial authentication, iris authentication, or vein authentication).

In addition to payments, when issuing instructions for processes requiring user authentication via gestures, it is necessary to accurately conduct both user authentication and gesture authentication. Further, executing biometric authentication requires preregistration of biometric data (e.g., the user's face, iris, or hand veins used for the authentication).

It is an object of the present disclosure to provide an authentication system, an authentication method, and a registration method that allow for accurate user authentication and gesture authentication.

An authentication system according to an aspect of the present disclosure includes one or more memories that store computer program code, and one or more processors. The one or more processors are configured to read the program code and operate as instructed by the program code. The program code includes first image acquisition code configured to cause at least one of the at least one processor to acquire one or more gesture images. Each of the gesture images depicts a hand of a user making a gesture that has been determined by the user. The program code includes data generation code configured to cause at least one of the at least one processor to generate reference data for the user by associating a gesture depicted in each of the one or more gesture images with one instruction selected by the user from multiple instructions. The reference data includes the one or more gesture images. The program code includes second image acquisition code configured to cause at least one of the at least one processor to acquire an authentication image. The authentication image depicts the hand of the user making the gesture. The program code includes authentication processing code configured to cause at least one of the at least one processor to execute biometric authentication and authentication of the gesture depicted in the authentication image by comparing the authentication image with the one or more gesture images. The program code includes instruction output code configured to cause at least one of the at least one processor to output the one instruction associated with the authenticated gesture.

An authentication method according to an aspect of the present disclosure includes acquiring, by one or more processors, one or more gesture images. Each of the gesture images depicts a hand of a user making a gesture that has been determined by the user. The authentication method includes associating, by the one or more processors, a gesture depicted in each of the one or more gesture images with one instruction selected by the user from multiple instructions. The authentication method includes acquiring, by the one or more processors, an authentication image. The authentication image depicts the hand of the user making the gesture. The authentication method includes executing, by the one or more processors, biometric authentication and authentication of the gesture depicted in the authentication image by comparing the authentication image with the one or more gesture images. The authentication method includes outputting, by the one or more processors, the one instruction associated with the authenticated gesture.

A registration method according to an aspect of the present disclosure is a registration method for registering one or more gesture images in a database. The registration method includes acquiring, by one or more processors, one or more gesture images. Each of the gesture images depicts a hand of a user making a gesture that has been determined by the user. The registration method includes generating, by the one or more processors, reference data by associating the gesture depicted in each of the one or more gesture images with one instruction selected by the user from multiple instructions. The reference data includes the one or more gesture images. The registration method includes storing, by one or more processors, the reference data in the database.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Examples of an authentication system, an authentication method, and a registration method will now be described with reference to the drawings. The scope of the present disclosure is defined not by the detailed description but by the claims and their equivalents, and all variations within the scope of the claims and their equivalents are to be construed as being included in the disclosure.

DESCRIPTION OF TERMS

In the present disclosure, the term "gesture" mainly refers to hand gestures involving the fingers. Gestures include static hand gestures but may also involve motions of the hand or arm. A single gesture is associated with one instruction. The system, device, method, and program of the present disclosure allow each user to associate a gesture that has been determined by the user with an instruction selected from multiple instructions.

Typically, multiple instructions are manually input into a device or system, for instance, via button operations. The instructions may be, for example, a series of instructions for making a payment at a cash register. For example, in the context of making payments at a store, the store operator may predefine multiple gesture-based instructions. The series of instructions may include, for example, a primary instruction (e.g., selecting a payment method) and an auxiliary instructions (e.g., presenting a loyalty card). A payment performed via a gesture-based instruction is referred to as a gesture-based payment.

The technology disclosed in the present disclosure provides authentication services that enable the replacement of such operational instructions with gestures associated with instructions. The instructions are not limited to operations associated with payments. The technology of the present disclosure can be employed in instructions for procedures requiring user authentication. In authentication services, user authentication and gesture authentication are performed before executing instructions. Hereinafter, the authentication of gestures will be simply referred to as gesture authentication.

Overview of Authentication System

Figure 1:
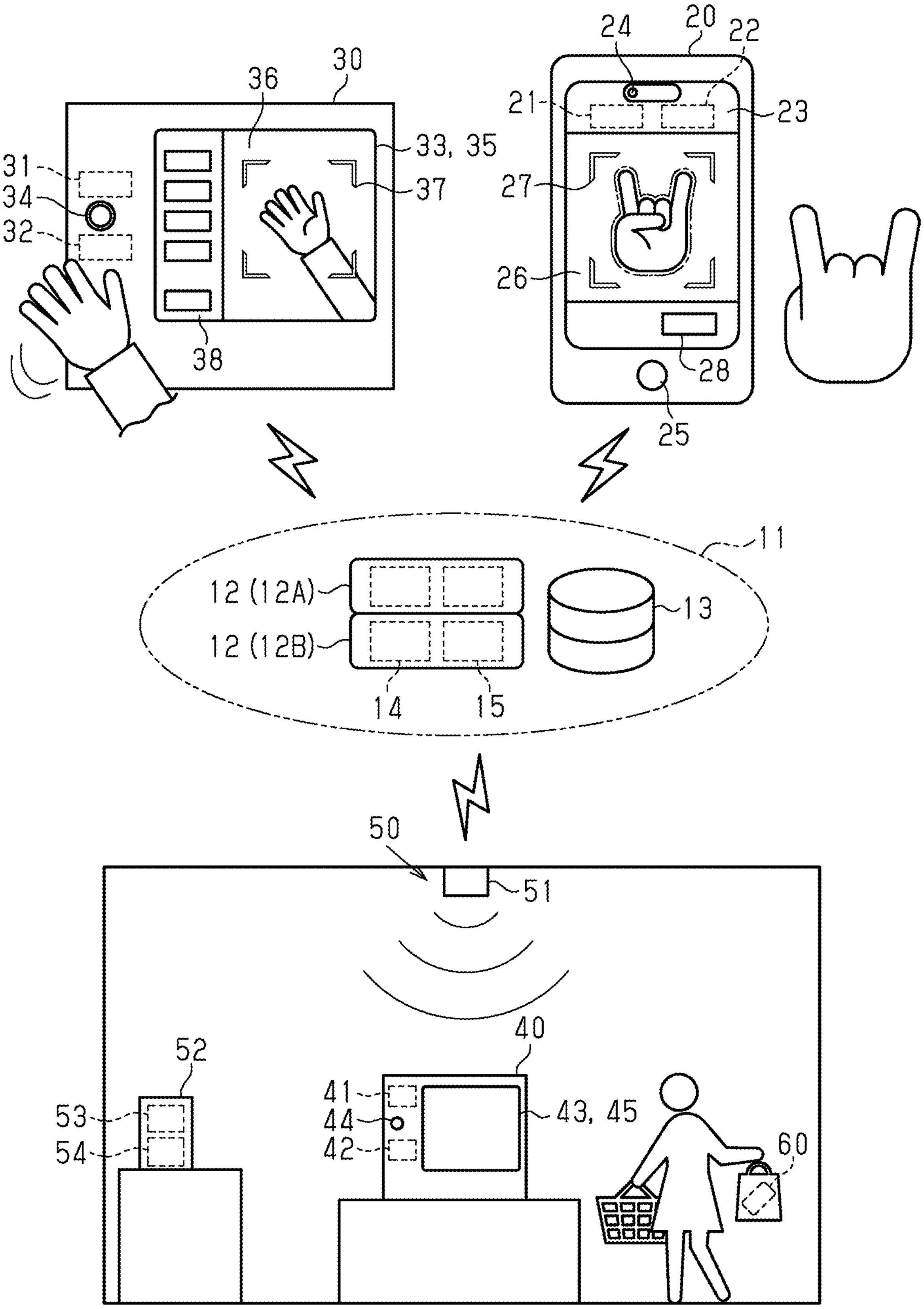
FIG. 1 is a schematic diagram illustrating the configuration of an authentication system according to an embodiment.

An authentication system 11, as shown in FIG. 1, is configured to provide authentication services. In addition, the authentication system 11 provides registration services that allow one or more users who use the authentication services to register user data. The authentication system 11 is configured to execute user authentication and gesture authentication based on a gesture image depicting the hand of the user making a gesture. The user data includes one or more gesture images that have been registered for executing user authentication and gesture authentication. User authentication based on gesture images is biometric authentication.

The authentication system 11 may include one or more servers 12 and a database 13. Each server 12 may include one or more processors 14 and one or more memories 15. The memory 15 stores various programs. The server 12 is configured to execute various features by executing one or more commands included in the programs with the one or more processors 14.

An example in which the one or more servers 12 include a registration server 12A and an authentication server 12B will now be described. In another example, one server 12 may act as the registration server 12A and the authentication server 12B. In a further example, at least one of the servers 12A or 12B may include the database 13. If the servers 12 do not include the database 13, each server 12 accesses the database 13 to refer to or update the data stored in the database 13.

The database 13 may include a store database and a user database. The store database includes store data of one or more stores that employ the authentication system 11. Examples of store data include, but are not limited to, the store name, store ID, location, and available payment methods. Examples of payment methods include, but are not limited to, electronic money payment, cash payment, credit card payment, and point-based payment. The user selects any payment method from one or more payment methods available at each store.

Electronic money payments may be, but are not limited to, electronic payments using preregistered credit card information, code-based payments using two-dimensional codes (e.g., QR Code®), or prepaid electronic money payments, where cash is loaded in advance.

The user database includes user data related to each user who uses the authentication system 11. Examples of user data include, but are not limited to, name, user ID, address, payment information, and various types of registration information related to authentication. Examples of payment information include credit card numbers, debit card numbers, and direct debit account numbers.

The authentication system 11 may include one or more authentication devices 40. The authentication device 40 may be installed in one or more stores that employ the authentication system 11. The authentication device 40 may include a guidance feature to guide operation methods using text information, illustrations, or sounds. The authentication device 40, as illustrated in FIG. 1, may be integrated with a payment terminal (e.g., a self-checkout device).

The authentication device 40 may include one or more processors 41, one or more memories 42, a display 43, a camera 44, and one or more operation units 45. The memory 42 stores an authentication program that is executed by the one or more processors 41 for an authentication process.

The camera 44 may be separate from the authentication device 40 or may be externally attached to the authentication device 40. The one or more operation units 45 may include buttons or may include a touch panel integrated with the display 43.

The authentication system 11 may include one or more registration devices 30. The location of the registration device 30 may be, but is not limited to, one or more stores that employ the authentication system 11. The registration device 30 may include a guidance feature to guide operation methods using text information, illustrations, or sounds.

The registration device 30 may include one or more processors 31, one or more memories 32, a display 33, a camera 34, and one or more operation units 35. The memory 32 stores a registration program that is executed by the one or more processors 31 to register user data. The camera 34 may be separate from the registration device 30 or may be externally attached to the registration device 30. The one or more operation units 35 may include buttons or may also include a touch panel integrated with the display 33.

The registration program includes commands for displaying a capture screen 36 on the display 33. The capture screen 36 may include a capture area 37, where the video captured by the camera 34 is displayed, and one or more operation buttons 38. The capture area 37 defines the range of an image to be obtained. The capture screen 36 allows the user to capture one or more gesture images for registration.

The captured gesture image is stored in the memory 32. As a result, the registration device 30 acquires the gesture image. If a user desires to issue multiple instructions with gestures, the user captures at least the same number of gesture images as the number of desired instructions. When the camera 34 is a three-dimensional camera, at least part of one or more gesture images may be three-dimensional images.

After capturing the gesture image, the user uses the registration device 30 to associate one gesture with one of the instructions. Based on the association, the registration device 30 generates reference data for the user. The reference data includes data used to identify the user, one or more gesture images, and data indicating the instruction associated with each gesture.

The registration device 30 is configured to send the generated reference data to the registration server 12A via a network. Examples of the network include, but are not limited to, the Internet, a wide area network (WAN), a local area network (LAN), a provider terminal, a wireless communication network, a wireless base station, and a dedicated line.

The registration server 12A acquires one or more gesture images by receiving reference data from the registration device 30. The registration server 12A is configured to register the reference data received from the registration device 30 in the database 13. The gesture image included in the reference data registered in the database 13 is also referred to as the reference image.

The authentication device 40 may be integrated with the registration device 30. In this case, the processor 41, the memory 42, the display 43, the camera 44, and the operation unit 45 may also serve as the processor 31, the memory 32, the display 33, the camera 34, and the operation unit 35, respectively.

The registration device 30 may be replaced with a user terminal 20 equipped with a camera that is used by the user. The user terminal 20 may be a computer with an external camera or may be a computer or a mobile terminal with a built-in camera. Examples of a mobile terminal includes, but are not limited to, a tablet or a smartphone.

The user terminal 20 includes, for example, one or more processors 21, one or more memories 22, a display 23, a camera 24, and one or more operation units 25. The one or more operation units 25 may include buttons or may also include a touch panel integrated with the display 23.

The user terminal 20 may have a registration application (hereinafter referred to as a registration app) installed. The program of the registration app is stored in the memory 22 upon installation. By executing the registration app program, the processor 21 enables the user terminal 20 to operate as the registration device.

The registration app program may include commands similar to those of the registration program stored in the memory 32 of the registration device 30, or may include commands that provide more limited features than the registration device 30. For example, there may be a feature difference between the registration program included in the registration app and the registration program of the registration device 30, where the registration device 30 can register a three-dimensional image as a gesture image whereas the user terminal 20 cannot.

Upon being launched by the user, the registration app displays the capture screen 26 on the display 23. The capture screen 26 may include a capture area 27, which shows a video taken by the camera 24, and one or more operation buttons 28. The capture area 27 defines the area of an image to be obtained.

When the user operates the operation button 28 (capture button) with the hand showing a hand gesture captured in the capture area 27, the registration app stores the acquired gesture image in the memory 22. As a result, the user terminal 20 acquires the gesture image. Then, the registration app generates reference data based on the operations performed by the user.

The registration app sends the generated reference data to the registration server 12A via the network. The registration server 12A acquires the gesture image by receiving the reference data, and registers the reference data in the database 13.

When the user performs a gesture-based payment, the authentication device 40 captures an image of the gesture indicated by the user for authentication. The image of the gesture captured by the authentication device 40 for authentication is referred to as the authentication image. The authentication device 40 is configured to send the authentication image, which has been obtained through capturing, to the authentication server 12B via the network.

The authentication image for a user may be the same type as the reference image registered by that user, or may be a different type of image. For example, when the reference image is a video, the authentication image may also be a video. Similarly, when the reference image is a three-dimensional image, the authentication image may also be a three-dimensional image. Instead, one of the authentication image and the reference image may be a still image while the other may be a video.

For example, when the reference image is a still image, the corresponding authentication image may be a video. In this case, multiple still images corresponding to various time points in the video may be generated, and these still images may then be compared with the reference image. Alternatively, when the reference image is a three-dimensional image, the corresponding authentication image may be a two-dimensional image. In this case, multiple two-dimensional images with mutually different viewpoints may be generated from the three-dimensional image, and the authentication image may be compared with these two-dimensional images.

The authentication server 12B executes user authentication and gesture authentication by comparing the authentication image with one or more reference images. Upon completion of the user authentication and the gesture authentication, the payment terminal executes a payment process for the authenticated user in accordance with the instructions associated with the authenticated gesture.

Registration of Gesture Images

Each reference image registered for a user needs to include at least gesture data that is based on the shape of the hand indicating a gesture. Gesture data is used to identify the gestures depicted in an image. Examples of gesture data may include, but are not limited to, data from which features (e.g., the contours of a hand) are extracted.

At least one of one or more reference images registered for a user needs to include biometric data that is based on the characteristics of the hand indicating a gesture. The characteristics of the hand reflected in the biometric data may include, for example, the palm, the back of the hand, the veins in the fingers, and the contours of the palm (i.e., palmistry lines). Biometric authentication may be palm authentication. Biometric authentication may be vein authentication based on the vein patterns of the palm, the back of the hand, or the fingers.

A gesture image that includes both biometric data and gesture data is referred to as a standard image. A gesture image that includes gesture data but does not include biometric data is referred to as an auxiliary image. The collective term for biometric data and gesture data is referred to as authentication data.

When registering multiple gestures, it may be challenging to devise or perform a wide variety of gestures that include biometric data, ensuring that either the palm or the back of the hand is visible. Therefore, when multiple gesture images are required, some of them may be auxiliary images. The registration program may include, as part of guidance, commands for displaying examples of gestures that are readily used as standard images or auxiliary images.

The registration program may include a command for determining whether biometric data can be acquired from the hand depicted in the gesture image. The registration program may further include a command to notify, when it is determined that the biometric data cannot be acquired, the user of the determination result.

For example, when biometric data and gesture data can both be obtained from the hand depicted in the capture area 27, the registration program may change the display. Examples of the change include, but are not limited to, changing the emphasized lines outlining the shape of the hand from blinking, which is indicated by the dashed line in FIG. 1, to steady illumination. In addition or instead, when biometric data and gesture data can be obtained from the hand depicted in the capture area 27, the operation button 28 may be displayed or may become operable. Such changes in the display on the screen are also examples of the notification.

Further, when biometric data cannot be acquired from the gesture image captured in the capture area 27, the registration program may include a command to determine whether gesture data can be acquired. The registration program may include a command to notify, when it is determined that the gesture data can be acquired, the user of the determination result. The notification may be a text-based or sound-based message, or may be a display change on the screen.

At least one of the biometric data and gesture data may be acquired by the registration server 12A. Further, the determination of whether these types of authentication data can be obtained may also be executed by the registration server 12A. In this case, the registration program includes a command for sending the acquired gesture image to the registration server 12A and a command for subsequently obtaining the determination result from the registration server 12A.

At least part of one or more gesture images may include a gesture video that depicts motion-based gestures. In a gesture video, motions may be used as gestures. Alternatively, a gesture video may depict a hand making a gesture while rotating around the forearm axis, with the palm or back of the hand being captured at varying angles relative to the camera. This allows the characteristics of the hand for biometric authentication to be captured from diverse perspectives.

The registration program may include commands to obtain still images from a gesture video and store them in the memory 22 as a series of gesture images. The series of gesture images includes multiple images depicting a single gesture captured in different directions.

Figure 2:
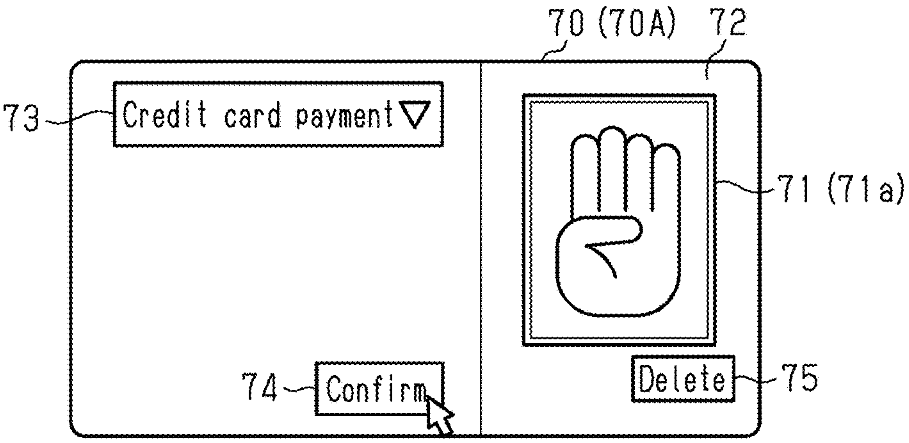
FIG. 2 is a schematic diagram illustrating an example of the registration screen displayed by the registration program of the embodiment.
Figure 3:
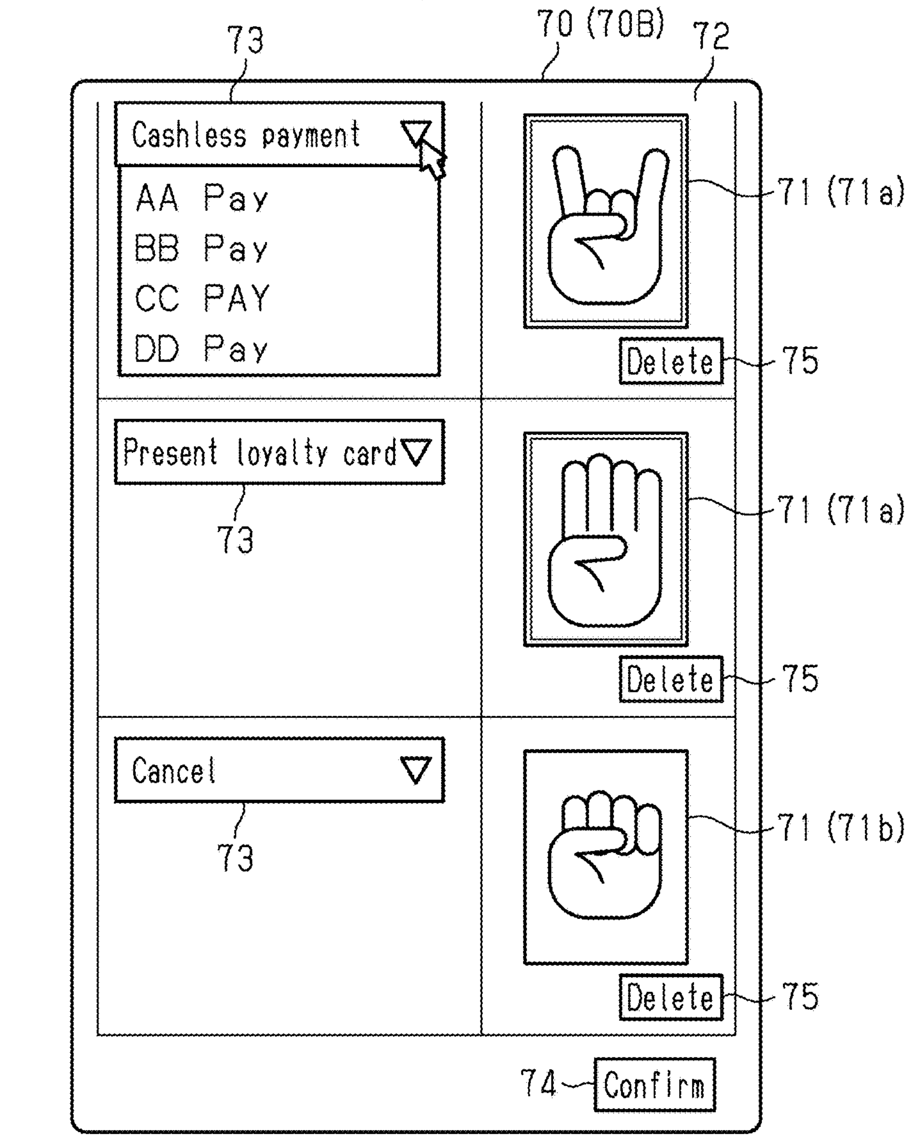
FIG. 3 is a schematic diagram illustrating another example of the registration screen displayed by the registration program of the embodiment.

FIGS. 2 and 3 illustrate a registration screen 70 (70A or 70B) that is shown on the display 33 by executing the registration program. The registration screen 70 is used by users to associate gestures with instructions.

The registration program may include a command for displaying, each time a gesture image is captured, the registration screen 70A including the captured gesture image 71 as shown in FIG. 2. In addition or instead, the registration program may include a command for displaying, after gesture images are captured, the registration screen 70B showing a list of the gesture images 71 as shown in FIG. 3. The user associates multiple instructions with the gesture images 71 via the registration screen 70B, respectively.

The registration screen 70 may include a display area 72 for a gesture image 71, one or more select buttons 73, one or more confirm buttons 74, and one or more delete buttons 75. The display area 72 shows one or more gesture images 71 captured by the camera 34. In correspondence with each gesture image, one or more select buttons 73 and one delete button 75 may be arranged. Upon the delete button 75 being operated, the corresponding gesture image is deleted from the memory 32.

When multiple gesture images 71 include an auxiliary image 71*b*, the display on the registration screen 70 may differ between the standard image 71*a* and the auxiliary image 71*b*. In FIGS. 2 and 3, the standard image 71*a* is displayed with a double border, and the auxiliary image 71*b* is displayed with a single border. Instead or in addition, each of the standard image 71*a* and the auxiliary image 71*b* may be assigned a different mark.

The registration program may include a command to display an edit screen (the same screen as the registration screen 70B) for modifying registered reference data. In the edit screen, users can delete registered gesture images and modify an instruction to associate.

One or more instructions may include, for example, one or more payment instructions respectively corresponding to one or more payment methods. The one or more payment methods include, but are not limited to, at least one of one or more electronic money payments, a cash payment, a credit card payment, and a point-based payment. The one or more electronic money payments may include electronic payment services provided by different service providers. Electronic money payments include code-based payments using two-dimensional codes.

The one or more instructions may include at least one of presenting a loyalty card related to a loyalty program, using points, using a coupon, or recharging electronic money. The loyalty program is designed to, for example, provide rewards to users. In this program, points are used as a medium for redeeming rewards. The unit of exchange for redeeming rewards is not limited to points. The unit may be changed to another name such as, miles, money coins, dollars, stamps, or cash.

When multiple gesture images 71 include an auxiliary image 71*b*, an associable instruction may differ between the standard image 71*a* and the auxiliary image 71*b*. For example, the auxiliary image 71*b* may be associated with an auxiliary one of multiple instructions. Auxiliary instructions do not have to be associated with payment. Examples of auxiliary instructions may include, but are not limited to, instructions such as "Cancel" for a previous instruction, "Check the balance," or "Issue a receipt" after the payment.

As shown in FIG. 3, multiple options respectively indicated by the select buttons 73 may be, for example, grouped by categories (e.g., "cashless payment," "point-related," or "other operations"). In this case, "other operations" may include auxiliary instructions. When the user specifies an instruction associated with each gesture image 71 using the select button 73 and then operates the confirm button 74, reference data is generated.

An instruction associated with a gesture depicted in a standard image may be an initial instruction to be issued at the beginning of a series of processes. An instruction associated with a gesture depicted in an auxiliary image may be an instruction to be issued after the initial instruction. The initial instruction may be, for example, the first or second instruction in the series of processes. In this case, if biometric authentication is successfully completed based on the standard image in the initial instruction, subsequent instructions may be assumed to be performed by the same user, allowing user authentication to be omitted for each instance.

For example, in a series of processes related to payment, if the first instruction is related to the presentation of a loyalty card (including an instruction "Do not present a loyalty card."), the second instruction may be to specify the payment method. Examples of subsequent instructions may include, but are not limited to, auxiliary instructions such as instructions to output a receipt or display the balance.

Registration Method

Figure 4:
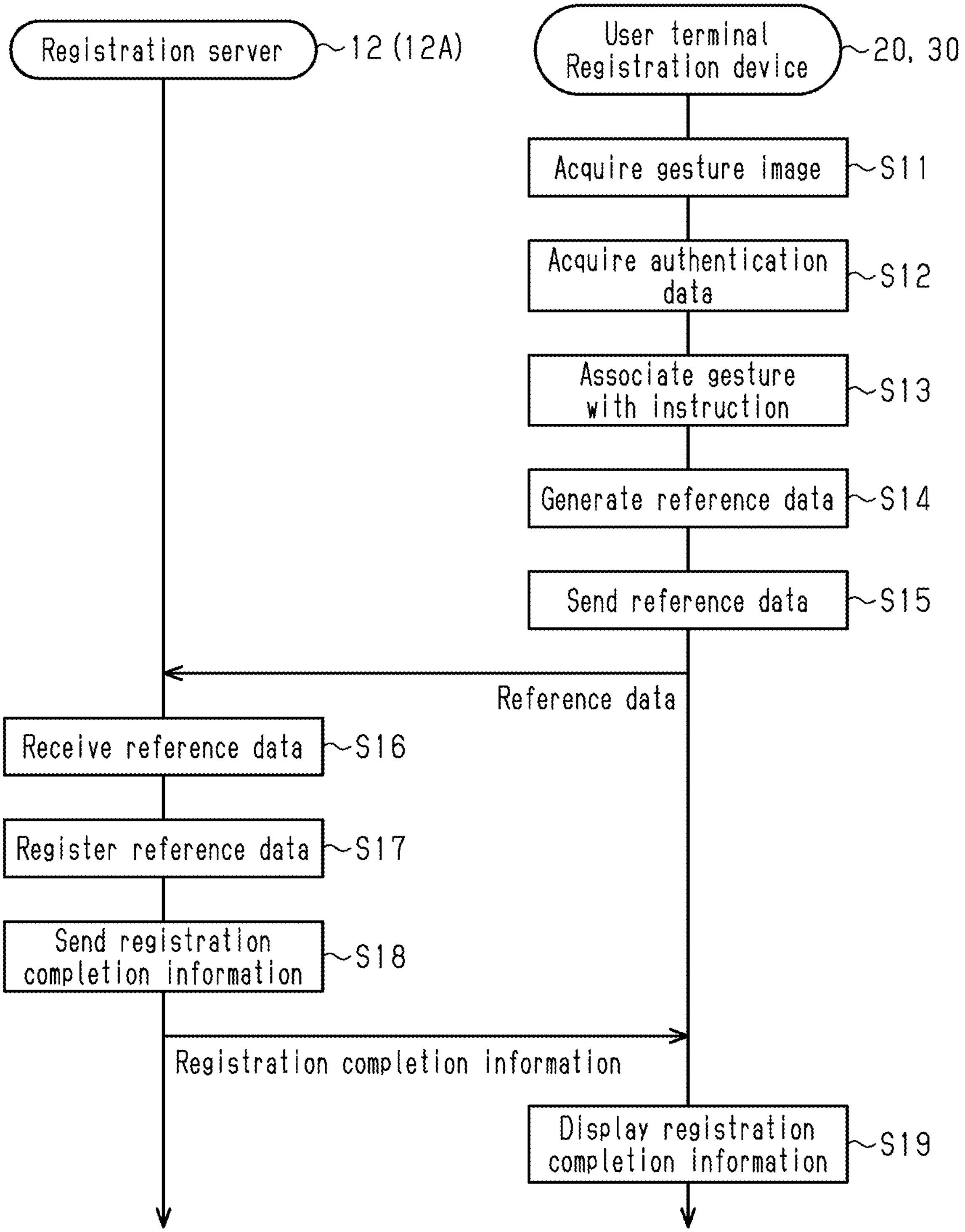
FIG. 4 is a flowchart illustrating the registration method of the embodiment.

The registration of a gesture image serving as a reference image will now be described with reference to FIG. 4. Hereinafter, the registration using the registration app of the user terminal 20 will be described. The same processes are also executed for the registration using the registration device 30.

When the user operates the operation button 28 in a state in which the hand indicating a gesture is shown in the capture area 27, a gesture image is acquired (step S11). Next, the registration app acquires authentication data from the acquired gesture image (step S12). The authentication data includes biometric data used for biometric authentication and gesture data used for gesture recognition.

The registration app associates the gesture captured in each of one or more gesture images with one of multiple instructions that has been selected by the user according to the user's operation via the registration screen 70 (step S13). As a result, the registration app generates reference data that includes the gesture image (step S14).

Subsequently, the registration app sends the generated reference data to the registration server 12A based on the user's operation (step S15). The registration server 12A acquires the gesture image by receiving the reference data (step S16). The registration server 12A registers the received reference data, as the user data for the corresponding user, in the user database (step S17).

The registration server 12A may send registration completion information to the user terminal 20 (or the registration device 30) that has sent the reference data (step S18). Upon receiving the registration completion information, the user terminal 20 (or the registration device 30) may display the registration completion information on the display 23 (step S19).

Customer Entry Detection System

As shown in FIG. 1, the authentication system 11 may include a customer entry detection system 50. The customer entry detection system 50 is used to assist user authentication executed by the authentication server 12B. The customer entry detection system 50 is configured to detect the user's visit to the store via the mobile terminal 60 carried by the user. The store is a store that employs the authentication system 11 and is registered in the store database.

The mobile terminal 60 may be, but is not limited to, a tablet, a smartphone, or a smartwatch. For example, the mobile terminal 60 may be a signal transceiver or may be the user terminal 20.

The customer entry detection system 50 may include one or more signal transmitters 51. The signal transmitter 51 is configured to transmit signals within a store. The signal transmitter 51 can be installed in one or more locations within the store (e.g., at the entrance, on the ceiling, or relatively near the cash register).

Examples of the signal transmitter 51 may include, but are not limited to, a beacon, an ultrasonic wave generator that emits ultrasonic waves, or a device that transmits short-range wireless communication (e.g., Bluetooth® or UWB) signals.

The mobile terminal 60 has a reception feature to receive signals transmitted from the signal transmitter 51. The reception feature may be included in a microphone installed in the mobile terminal 60 or in a short-range wireless signal receiver.

The customer entry detection system 50 may include a management computer 52 that is installed in each store. The management computer 52 may include one or more processors 53 and one or more memories 54. The memory 54 stores programs for enabling various features. The management computer 52 may be configured to control one or more signal transmitters 51. The management computer 52 may be capable of communicating with the authentication server 12B via the network.

The memory of the mobile terminal 60 may store a notification program for customer entry notifications. When the mobile terminal 60 is the user terminal 20, the notification program may be included in the program of the registration app.

The notification program includes a command to send a customer entry notification to the authentication server 12B when the mobile terminal 60 receives a signal transmitted from the signal transmitter 51. Alternatively, the mobile terminal 60 may send a customer entry notification to the management computer 52, and then the management computer 52 may forward the customer entry notification to the authentication server 12B.

The customer entry notification includes user information. User information does not have to include personal information such as the user name, as long as it includes at least a user ID used to identify the user.

FIG. 1 illustrates the signal transmitter 51, which is installed on the ceiling relatively near the cash register. The signal transmitter 51 relatively near the cash register allows the mobile terminal 60 to receive a signal as the mobile terminal 60 approaches the cash register. Therefore, when the mobile terminal 60 sends a customer entry notification to the authentication server 12B, the authentication server 12B detects that the user has approached the cash register.

User Authentication and Gesture Authentication

Figure 5:
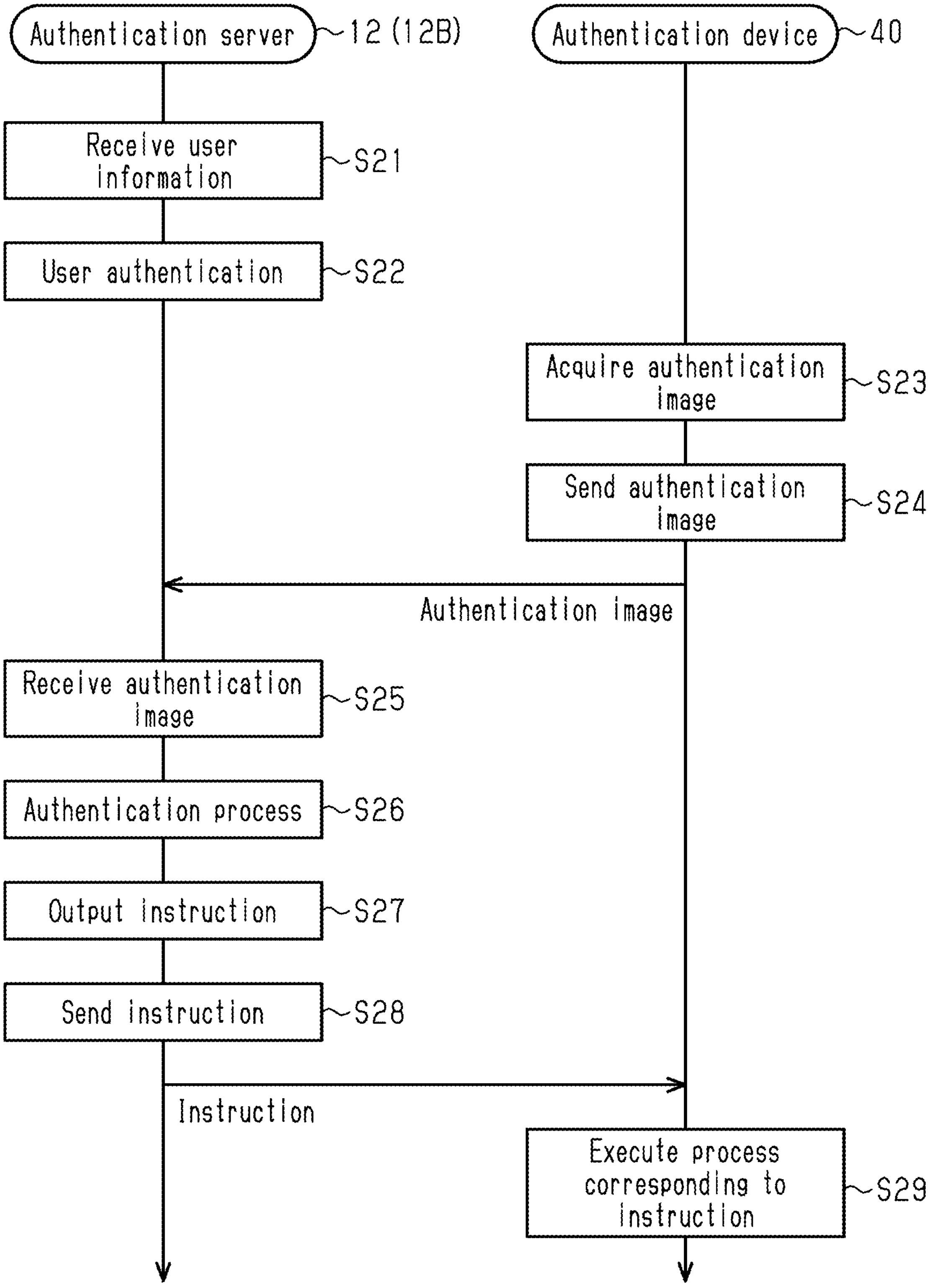
FIG. 5 is a flowchart illustrating the authentication method of the embodiment.

The authentication process executed by the authentication server 12B prior to the payment will now be described with reference to FIG. 5, using an example in which the user visits a store and performs a gesture-based payment at a self-checkout device. The authentication process includes user authentication and gesture authentication.

When the user carrying the mobile terminal 60 approaches the self-checkout device, the mobile terminal 60 receives the signal transmitted from the signal transmitter 51. Upon receiving the signal, the mobile terminal 60 sends a customer entry notification to the authentication server 12B.

The authentication server 12B receives the user information included in the customer entry notification (step S21). Next, the authentication server 12B executes user authentication based on the user information (step S22). Specifically, the authentication server 12B refers to the user database to detect the user who owns the mobile terminal 60 that has transmitted the user information.

While the user detected in this step is not necessarily a user who will perform a gesture-based payment, the user is highly likely to make a payment. Thus, the authentication server 12B stores the detected user's user information in the memory 15 as candidate data, along with the detection date and time. The candidate data may be deleted after a certain duration has elapsed, ensuring that only most-recent candidate data within a predetermined period is retained. The predetermined period can be set, for example, according to the waiting time at the cash register.

Before making a gesture-based payment at the self-checkout device, the user performs user authentication with a gesture using the authentication device 40, which is integrated with the self-checkout device. The user authentication also serves as an operation instruction associated with the gesture.

First, the user performs a gesture toward the camera 44 to make an initial instruction, following the guidance of the authentication device 40. The authentication device 40 captures the gesture image using the camera 44. As a result, the authentication device 40 acquires an authentication image that depicts the user's hand performing the gesture (step S23). Subsequently, the authentication device 40 sends the acquired authentication image to the authentication server 12B (step S24).

The authentication server 12B receives the authentication image sent by the authentication device 40 (step S25). As a result, the authentication server 12B acquires the authentication image.

Subsequently, the authentication server 12B executes the authentication process (step S26). The authentication process includes a biometric authentication process and a gesture authentication process. Specifically, the authentication server 12B compares the authentication image with one or more reference images registered in the user database.

When one or more users are detected in step S22, the authentication server 12B should first compare reference images and authentication images of the one or more users detected as having visited. If the authentication data between the detected user's reference image does not match the authentication image, the authentication server 12B should compare the reference image and the authentication image of another user not detected as having visited.

In the authentication process, first, the authentication server 12B may perform the biometric authentication process by comparing the biometric data obtained from the authentication image with the biometric data of one or more reference images. The reference image that contains biometric data matching the biometric data of the authentication image is detected by the biometric authentication process. The authentication server 12B may compare the gesture data obtained from the authentication image with the gesture data of the reference image detected during the biometric authentication process. Consequently, performing two-factor authentication using biometric data and gesture data enhances the authentication accuracy.

Alternatively, the authentication server 12B may execute both biometric authentication and gesture authentication using only biometric data. This is because, for example, in palm authentication or vein authentication, the biometric data includes the characteristics of the hand while displaying a gesture (hand gesture), and biometric data can also contain gesture data. In another example, the authentication server 12B may execute a two-factor authentication using biometric data and gesture data if the match rate of the biometric data between the authentication image and the reference image is less than a predetermined threshold.

The authentication process is completed by identifying the reference image in which its biometric data matches that of the identification image. Then, the authentication server 12B outputs an instruction associated with the identified reference image (step S27).

The authentication server 12B sends the generated instruction to the authentication device 40 (step S28). Upon receiving the instruction, the authentication device 40 executes the process corresponding to that instruction (step S29). For example, when the instruction is "Credit Card Payment," which specifies a payment method, the payment terminal integrated with the authentication device 40 executes the credit card payment using the credit card number registered as the user data of the target user. FIG. 5 shows that the authentication device 40 is integrated with the payment terminal executes step S29. If the payment terminal is separate from the authentication device 40, the separate authentication device 40 executes the process of step S29.

For example, when providing an additional instruction (e.g., presenting a loyalty card or recharging electronic money) at the payment, the user performs the corresponding gesture toward the camera 44 following the guidance of the authentication device 40. Then, the authentication device 40 and the authentication server 12B repeat steps S23 to S29.

Operation of Present Disclosure

In the technology disclosed in the present disclosure, user authentication and gesture authentication can be performed using gesture images. This simplifies the configuration of the authentication device 40 and reduces user effort, compared to a device that separately executes user authentication (e.g., facial authentication or iris authentication) and gesture authentication.

If gestures respectively corresponding to instructions are predefined, the number of gesture options available becomes limited. This is because, for example, when palm authentication is used, the gestures that allow the palm to be visible are inherently limited. As a result, it becomes difficult to select multiple payment methods or issue multiple auxiliary instructions using gestures alone. If, for example, motion-based gestures are used, the variety of gestures increases. However, it becomes difficult for users to memorize and replicate those predefined gestures.

The technology disclosed in the present disclosure allows users to determine the gesture corresponding to each instruction. Thus, the users only need to register gestures corresponding to the instructions they frequently use. This allows the users to select a gesture that they find convenient to perform, thereby executing a desired one from multiple instructions. Consequently, users experience greater convenience.

Advantages of Present Disclosure

The present disclosure has the following advantages.

(1) The gesture depicted in a gesture image is determined by users. This allows the users to select gestures that they can readily remember and perform. Moreover, even when the same instruction is given, gestures vary between users. Thus, even if a gesture is made in public places (e.g., the front of a store), a third party will not understand what instruction the gesture represents. Therefore, the method of the present disclosure is more secure compared to a case in which gestures are predefined for instructions.

(2) From ten or more payment methods, users only need to determine the gesture corresponding to the payment method they use. This allows the users to associate their preferred gesture with a frequently-used payment method as a priority.

(3) Gestures are respectively associated with multiple auxiliary instructions related to payment (e.g., presenting a loyalty card, using points, using coupons, or recharging electronic money). This allows users to perform the corresponding process without using, for example, a loyalty card, an electronic money card, or a mobile terminal.

(4) The vein pattern of the hand indicating a hand gesture is used as biometric data. This allows biometric authentication and gesture authentication to be simultaneously executed.

(5) When the gesture image is a gesture video, motion-based characteristics are added to characteristics obtained from a static hand gesture. Thus, a wider variety of gestures is provided.

(6) When the gesture image is a series of images or a three-dimensional image, gesture data and biometric data viewed from multiple angles are obtained. This increases the authentication accuracy. Moreover, even in motion-based gestures, if a series of images or a three-dimensional image is used, gesture data and biometric data are readily acquired.

(7) In a case in which the user is free to choose their gestures, there may be cases where biometric data cannot be obtained from the gesture image, for example, if the palm is not clearly visible. When biometric data cannot be obtained, a notification is sent to the users, prompting them to retake the gesture image.

(8) From one gesture image, gesture data indicating the characteristics of the shape of the hand and biometric data used for biometric authentication may be separately acquired. For example, in palm authentication or vein authentication, the biometric data includes the characteristics of the hand showing a gesture (hand gesture). Thus, even only with biometric data, gestures are identifiable. However, in a hand gesture with one or more fingers bent, it may be difficult to distinguish characteristics such as the contours of the palm or the veins. In this case, in addition to using biometric data for authentication, gesture data is also used to enhance the authentication accuracy.

(9) In addition to standard images, which include both biometric data and gesture data, auxiliary images, which only include gesture data, are employed. This increases the variety of gesture patterns. For example, since auxiliary images do not necessarily need to include biometric data, a wider variety of gestures are provided.

(10) A series of processes related to payment allows for user authentication at the initial stage of a process by associating the initial instruction with the gesture depicted in the standard image. In subsequent processes, user authentication has already been completed. This allows for instructions using gestures depicted in auxiliary images.

(11) Upon receiving a signal that is transmitted within the store, the mobile terminal 60 sends user information to the authentication server 12B. This allows the authentication server 12B to detect that the corresponding user is present within the store. Therefore, prior to performing biometric authentication, user authentication is conducted to narrow down potential users. This reduces comparison time and computational load. Further, two factors, i.e., customer entry detection and biometric authentication, are used to perform authentication, thereby increasing the authentication accuracy.

Modifications

The present embodiment may be modified as follows. The present embodiment and the following modifications can be combined as long as they remain technically consistent with each other.

First Modification

Motion-based gestures may include changing hand gestures. For example, the gesture may involve a motion that transitions from an open palm to a closed palm, or may involve the action of flipping the palm. In this case, the motion may be acquired as gesture data. Alternatively, the shapes of the hand at two or more points in time during a series of motions may be acquired as gesture data.

Second Modification

The process executed by an instruction with a gesture is not limited to payment. For example, gesture-based authentication may be used for one or more processes or a series of processes related to reservation, investment, bidding, admission to facility, and renting goods including vehicles.

Third Modification

If the registration device 30 is integrated with the authentication device 40, the memory 32 may store the database 13. In this case, steps S15, S16, S18, S24, S25, and S28 may be omitted, and the processes of steps S17, S26, and S27 may be executed by the registration device 30 (the authentication device 40). Further, the authentication system 11 may include one or more registration devices 30 (authentication devices 40), without the registration server 12A, the authentication server 12B, or the database 13.

Fourth Modification

The memory 42 of the authentication device 40 may store the database 13. In this case, steps S24, S25, and S28 may be omitted, and the processes of steps S26 and S27 may be executed by the authentication device 40 instead of the authentication server 12B. In this case, the authentication system 11 does not have to include the authentication server 12B or the database 13.

Fifth Modification

The memory 54 of the management computer 52 may store the database 13. In this case, the management computer 52 may execute the processes of steps S26 to S27 instead of the authentication server 12B. In this case, the authentication system 11 does not have to include the authentication server 12B or the database 13.

Sixth Modification

Steps S12 to S14 may be executed by the registration server 12A instead of the user terminal 20 or the registration device 30. In this case, after step S11, the user terminal 20 or the registration device 30 sends the acquired gesture image to the registration server 12A.

First Specific Configuration of Embodiment

Each of the processors 14, 21, 31, 41, and 53 is, for example, a central processing unit (CPU), a graphics processing unit (GPU), a microprocessor unit (MPU), a field-programmable gate array (FPGA), or any other arithmetic unit. Each of the processors 14, 21, 31, 41, and 53 may be processing circuitry configured to execute various types of software processing. The processing circuitry may include a dedicated hardware circuit (e.g., ASIC) used to process at least part of the software processing. That is, the software processing may be executed by processing circuitry including at least one of a set of one or more software processing circuits and a set of one or more dedicated hardware circuits.

Second Specific Configuration of Embodiment

The memories 15, 22, 32, 42, 54 may be non-transitory computer-readable media. The memories 15, 22, 32, 42, 54 may include, for example, a random-access memory (RAM) or another type of a volatile memory. The memories 15, 22, 32, 42, 54 may be configured to temporarily store programs and data. The memories 15, 22, 32, 42, 54 may include a storage that permanently stores data including programs. The program permanently stored in the memories 15, 22, 32, 42, 54 may include an operating system (OS) for controlling the overall operation of the computer and applications for executing specific operations.

Clauses

Concepts that can be understood from each of the above-described embodiment and modifications will now be described.

[Clause 1]

An authentication system, including:

a first image acquisition unit configured to acquire one or more gesture images, each of the gesture images depicting a hand of a user making a gesture that has been determined by the user;

a data generator configured to generate reference data for the user by associating a gesture depicted in each of the one or more gesture images with one instruction selected by the user from multiple instructions, the reference data including the one or more gesture images;

a second image acquisition unit configured to acquire an authentication image, the authentication image depicting the hand of the user making the gesture;

an authentication processor configured to execute biometric authentication and authentication of the gesture depicted in the authentication image by comparing the authentication image with the one or more gesture images; and an instruction output unit configured to output the one instruction associated with the authenticated gesture.

In the above-described embodiment, the user terminal 20 (particularly, the camera 24) or the registration device 30 (particularly, the camera 34) that acquires a gesture image in step S11 corresponds to the first image acquisition unit. Alternatively, the registration server 12A that acquires the gesture image in step S16 corresponds to the first image acquisition unit. The user terminal 20 or the registration device 30 that executes steps S13 and S14 corresponds to the data generator. The authentication device 40 (particularly, the camera 44) that captures an authentication image in step S23 or the authentication server 12B that captures the authentication image in step S25 corresponds to the second image acquisition unit. The authentications server 12B that executes the authentication process in step S26 corresponds to the authentication processor. The authentication device 40 that outputs an instruction in step S27 corresponds to the instruction output unit.

[Clause 2]

The authentication system according to clause 1, where the instructions include payment instructions, each corresponding to a different payment method, and the payment methods include at least one of one or more electronic money payments, a cash payment, a credit card payment, or a point-based payment.

[Clause 3]

The authentication system according to clause 1 or 2, where the instructions include at least one of presenting a loyalty card, using points, using a coupon, or recharging electronic money.

[Clause 4]

The authentication system according to any one of clauses 1 to 3, where the biometric authentication is vein authentication based on a vein pattern of a palm or a back of the hand.

[Clause 5]

The authentication system according to any one of clauses 1 to 4, where the one or more gesture images include a gesture video that captures a motion-based gesture.

[Clause 6]

The authentication system according to any one of clauses 1 to 5, where at least one of the authentication image or the one or more gesture images is a series of images that includes images depicting a single gesture in different directions or is a three-dimensional image.

[Clause 7]

The authentication system according to any one of clauses 1 to 6, further including a controller configured to:

determine whether biometric data for the biometric authentication can be acquired from the hand depicted in each of the one or more gesture images; and when it is determined that the biometric data cannot be acquired, notify the user of a result of the determination.

In the above-describe embodiment, the registration device 30, the user terminal 20, or the registration server 12A that executes the above-described determination and notification corresponds to the controller. Specifically, when the processor 21, 31, or 14 executes a command related to the determination and notification included in the registration program, the registration device 30, the user terminal 20, or the registration server 12A operates as the controller.

[Clause 8]

The authentication system according to any one of clauses 1 to 7, further including one or more information acquisition units configured to:

acquire gesture data from each of the one or more gesture images, the gesture data being used to identify the gesture; and acquire biometric data for the biometric authentication from at least part of the one or more gesture images.

In the above-describe embodiment, the registration device 30, the user terminal 20, or the registration server 12A that acquires authentication data in step S12 corresponds to the data acquisition unit (gesture data acquisition unit and biometric data acquisition unit).

[Clause 9]

The authentication system according to clause 8, where the one or more gesture images include a standard image that contains the biometric data and the gesture data and an auxiliary image that contains only the gesture data of the biometric data and the gesture data.

[Clause 10]

The authentication system according to clause 9, where the instructions are issued by the user to execute a series of processes associated with a payment, an instruction associated with the gesture depicted in the standard image is an initial instruction to be issued at a beginning of the series of processes, and an instruction associated with the gesture depicted in the auxiliary image is an instruction to be issued after the initial instruction.

[Clause 11]

The authentication system according to any one of clauses 1 to 10, further including:

a signal transmitter configured to transmit a signal within a store; and an authentication server, where the authentication server is configured to:

when a mobile terminal carried by the user receives the signal and then sends user information that is used to identify the user, receive the user information; and after receiving the user information, authenticate the user based on the user information.

[Clause 12]

An authentication method, including:

acquiring one or more gesture images, each of the gesture images depicting a hand of a user making a gesture that has been determined by the user;

associating a gesture depicted in each of the one or more gesture images with one instruction selected by the user from multiple instructions;

acquiring an authentication image, the authentication image depicting the hand of the user making the gesture;

executing biometric authentication and authentication of the gesture depicted in the authentication image by comparing the authentication image with the one or more gesture images; and outputting the one instruction associated with the authenticated gesture.

[Clause 13]

A registration device that registers one or more gesture images, the registration device including:

one or more processors; and one or more memories that stores a registration program, where the registration program is configured to be executed by the one or more processors, and the registration program includes:

a command of acquiring one or more gesture images, each of the gesture images depicting a hand of a user making a gesture that has been determined by the user; and a command of generating reference data by associating the gesture depicted in each of the one or more gesture images with one instruction selected by the user from multiple instructions, the reference data including the one or more gesture images.

[Clause 14]

A registration method for registering one or more gesture images in a database, the registration method including:

acquiring one or more gesture images, each of the gesture images depicting a hand of a user making a gesture that has been determined by the user;

generating reference data by associating the gesture depicted in each of the one or more gesture images with one instruction selected by the user from multiple instructions, the reference data including the one or more gesture images; and storing the reference data in the database.

[Clause 15]

A program including commands, the commands including:

a command of acquiring one or more gesture images, each of the gesture images depicting a hand of a user making a gesture that has been determined by the user; and a command of generating reference data by associating the gesture depicted in each of the one or more gesture images with one instruction selected by the user from multiple instructions, the reference data including the one or more gesture images.

[Clause 16]

The program according to clause 15, where the commands further include:

a command of acquiring an authentication image, the authentication image depicting the hand of the user making the gesture;

a command of executing biometric authentication and authentication of the gesture depicted in the authentication image by comparing the authentication image with the one or more gesture images; and a command of outputting the one instruction associated with the authenticated gesture.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An authentication system, comprising:

a signal transmitter configured to transmit a signal within a store;

an authentication server;

one or more memories that store computer program code; and one or more processors, wherein the one or more processors are configured to read the program code and operate as instructed by the program code, and the program code includes:

first image acquisition code configured to cause at least one of the at least one processor to acquire one or more gesture images, each of the gesture images depicting a hand of a user making a gesture that has been determined by the user, data generation code configured to cause at least one of the at least one processor to generate reference data for the user by associating a gesture depicted in each of the one or more gesture images with one instruction selected by the user from multiple instructions, the reference data including the one or more gesture images;

second image acquisition code configured to cause at least one of the at least one processor to acquire an authentication image, the authentication image depicting the hand of the user making the gesture;

authentication processing code configured to cause at least one of the at least one processor to execute biometric authentication and authentication of the gesture depicted in the authentication image by comparing the authentication image with the one or more gesture images; and instruction output code configured to cause at least one of the at least one processor to output the one instruction associated with the authenticated gesture, wherein the instructions include payment instructions, each corresponding to a different payment method, and the payment methods include at least one of one or more electronic money payments, a cash payment, a credit card payment, or a point-based payment, wherein the instructions include at least one of presenting a loyalty card, using points, using a coupon, or recharging electronic money, wherein the biometric authentication is vein authentication based on a vein pattern of a palm or a back of the hand, and wherein the one or more gesture images include a gesture video that captures a motion-based gesture; and wherein a mobile terminal carried by the user receives the signal from the signal transmitter and sends user information that is used to identify the user to the authentication server, and wherein the authentication server is configured to authenticate the user based on the user information received from the mobile terminal.

2. The authentication system according to claim 1, wherein at least one of the authentication image or the one or more gesture images is a series of images that includes images depicting a single gesture in different directions or is a three-dimensional image.

3. The authentication system according to claim 1, wherein the program code further includes control code configured to cause at least one of the at least one processor to:

determine whether biometric data for the biometric authentication can be acquired from the hand depicted in each of the one or more gesture images; and when it is determined that the biometric data cannot be acquired, notify the user of a result of the determination.

4. The authentication system according to claim 1, wherein the program code further includes one or more information acquisition codes that include:

gesture data acquisition code configured to cause at least one of the at least one processor to acquire gesture data from each of the one or more gesture images, the gesture data being used to identify the gesture; and biometric data acquisition code configured to cause at least one of the at least one processor to acquire biometric data for the biometric authentication from at least part of the one or more gesture images.

5. The authentication system according to claim 4, wherein the one or more gesture images include a standard image that contains the biometric data and the gesture data and an auxiliary image that contains only the gesture data of the biometric data and the gesture data.

6. The authentication system according to claim 5, wherein the instructions are issued by the user to execute a series of processes associated with a payment, an instruction associated with the gesture depicted in the standard image is an initial instruction to be issued at a beginning of the series of processes, and an instruction associated with the gesture depicted in the auxiliary image is an instruction to be issued after the initial instruction.

7. The authentication system according to claim 1, wherein the one or more gesture images include multiple gesture images, and the data generation code is further configured to cause at least one of the at least one processor to:

display a registration screen that shows a list of the acquired gesture images, the registration screen displaying multiple instructions that are respectively associated with the gesture images shown in the list; and generate reference data for the user by associating, with one of the instructions that has been selected by the user via the registration screen, a gesture depicted in each of the gesture images.

8. An authentication method, comprising:

acquiring, by one or more processors, one or more gesture images, each of the gesture images depicting a hand of a user making a gesture that has been determined by the user, associating, by the one or more processors, a gesture depicted in each of the one or more gesture images with one instruction selected by the user from multiple instructions;

acquiring, by the one or more processors, an authentication image, the authentication image depicting the hand of the user making the gesture;

executing, by the one or more processors, biometric authentication and authentication of the gesture depicted in the authentication image by comparing the authentication image with the one or more gesture images;

outputting, by the one or more processors, the one instruction associated with the authenticated gesture;

wherein the instructions include payment instructions, each corresponding to a different payment method, and the payment methods include at least one of one or more electronic money payments, a cash payment, a credit card payment, or a point-based payment, wherein the instructions include at least one of presenting a loyalty card, using points, using a coupon, or recharging electronic money, wherein the biometric authentication is vein authentication based on a vein pattern of a palm or a back of the hand, and wherein the one or more gesture images include a gesture video that captures a motion-based gesture; and transmitting, by a signal transmitter, signal within a store;

receiving, the signal from the signal transmitter, by a mobile terminal carried by the user and sending, by the mobile terminal, user information that is used to identify the user to the authentication server; and authenticate the user, by the authentication server, based on the user information received from the mobile terminal.

* * * * *